March 2, 1926.

H. DEAN

AIR HOSE NIPPLE 1,575,600

Filed March 9, 1922

Inventor.

Herbert Dean

Patented Mar. 2, 1926.

1,575,600

UNITED STATES PATENT OFFICE.

HERBERT DEAN, OF BRANDON, MANITOBA, CANADA, ASSIGNOR OF ONE-HALF TO GEORGE SAMUEL MORRIS, OF BRANDON, CANADA.

AIR-HOSE NIPPLE.

Application filed March 9, 1922. Serial No. 542,407.

*To all whom it may concern:*

Be it known that I, HERBERT DEAN, a citizen of the Dominion of Canada, residing at No. 147 Tenth Street East, in the city of Brandon, in the Province of Manitoba, Canada, have invented certain new and useful Improvements in an Air-Hose Nipple for Use in Connection with Air Brakes and Air Signals on Railway Cars, Coaches, Engines, Etc., of which the following is a specification.

This invention relates to improvements in hose nipples which are particularly used on railway trains and an object of the invention is to provide a nipple which will positively prevent the hose from contacting with any part of the car or engine with which it is associated and which will suspend the hose and coupling at all times clear of the road bed, ties, or tracks, and sufficiently high so that it will not strike any object lying on the road bed.

A further object is to construct a nipple so that the hose can be, at all times, easily coupled together and with little movement of the couplings and which is particularly advantageous in colder countries and in saving the hose where the same is subjected to freezing.

A further object is to construct a nipple which allows of an adjustment being made in the length of the hose.

A further object is to construct a nipple which can be introduced in the present hose system without having to materially alter the same.

With the above more important objects in view the invention consists essentially in the arrangement and construction of parts hereinafter more particularly described and later pointed out in the appended claims, reference being had to the accompanying drawing in which:

In the drawing like characters of reference indicate corresponding parts in the several figures.

As is well known the engine and the various cars of a train are connected by car couplers, indicated at 1 and 2, and are fitted with an air brake system, the air being carried in pipes 3 located on the underside of the cars and terminating at the ends of the cars in angle cocks 4. At the present time a short nipple is screwed into the angle cock and to this nipple a comparatively long hose is attached, the hose in reality being approximately twenty-two inches long and having the free end thereof carrying the customary coupling hook.

As, in the above arrangement there is a considerable length of hose and the upper end of the hose is connected to the angle cock which is at the end of the car, the hose, which in time becomes quite flexible, can drag on the track when uncoupled or can swing freely and may become caught around the draft gear rigging of the car. This might occur when cars uncouple and if the hose drags it will become worn or it may become caught in a frog or such like and become broken. On the other hand, if the hose should swing up and become caught in the draft gear rigging it will be kinked more or less centrally of its length and will close the hose and prevent the escape of air, with the result that the air brakes will not be set.

In winter time a long hose, when frozen, is apt to crack when bent sufficiently to make the coupling between hoses and difficulty is also experienced owing to the stiffness of the frozen hose and the amount of bend required in making the coupling between the hose. I have mentioned the aforegoing disadvantages of the present hose in order that my invention, shortly described, and which is extremely simple, may be better appreciated.

Figure 1:
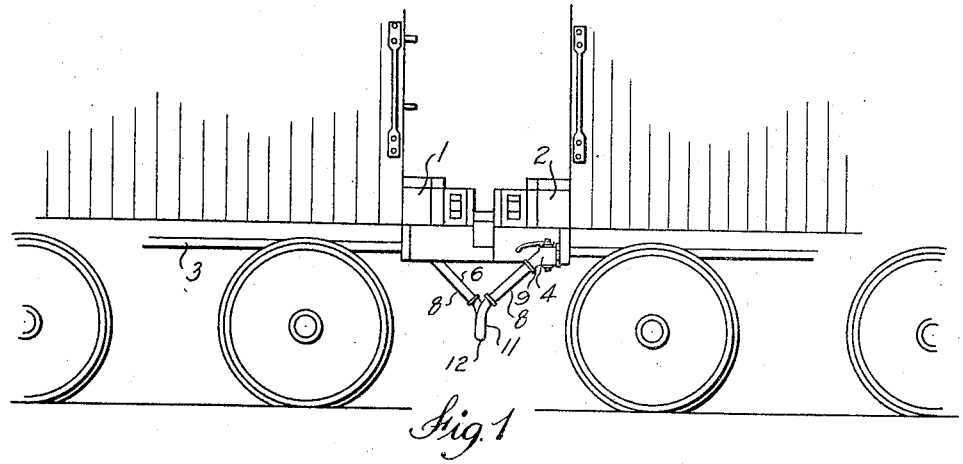
Fig. 1 is a side view of two cars coupled together and fitted with my hose nipples.
Figure 2:
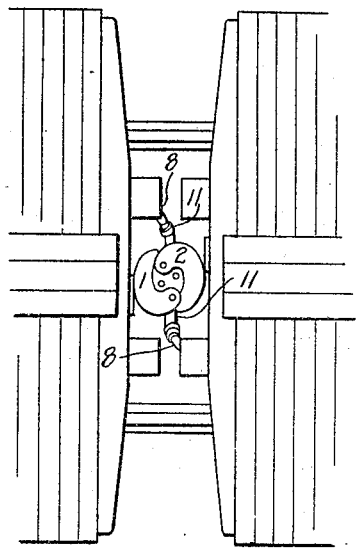
Fig. 2 is a plan view of the parts appearing in Fig. 1.
Figure 3:
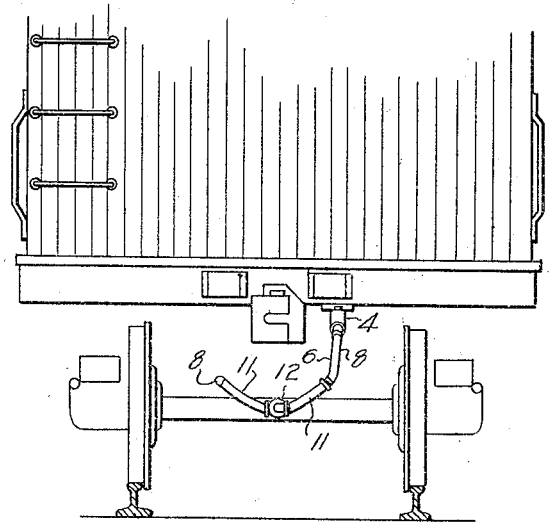
Fig. 3 is an end view of a car showing the hose coupled together, one of the hose nipples having a portion thereof cut away.
Figure 4:
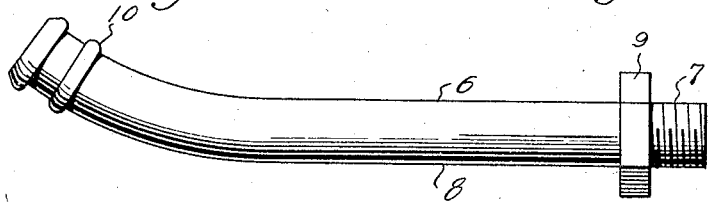
Fig. 4 is a side view of the nipple.

Instead of the usual short nipple I substitute an improved nipple, as indicated at 6, Fig. 4, the improved nipple presenting a screw threaded upper end 7 and having a comparatively long tubular extension 8 which has the lower end thereof angularly bent or deflected, the bend being approximately a twenty-five degree one. A hexagon head 9 is provided adjoining the screw threaded end for tightening up the nipple and the lower end thereof is supplied with a rib 10 for retaining the hose.

The hose 11, which according to my invention, is approximately half the length of the ordinary hose, that is to say, about eleven inches long, is attached to the lower end of my nipple by forcing the one end thereof over the rib 10. The lower end of the hose is provided with the customary coupling hook 12 as at present used. As the hose which I employ is comparatively short it is consequently more rigid and as the nipple which I provide has the lower end bent, the hose normally extends angularly inwardly and downwardly but is supported well clear of the track at all times. Further, the hose is of such a length and it is supported sufficiently far enough away from the car that it cannot possibly get caught on the draft rigging. In this connection I might remark that it is the coupling hook at the end of the hose which catches on the draft rigging. Further, the hose to be coupled together are extending towards one another in the uncoupled position and very little bending of the hose is required to make the coupling. This allows of the easier and quicker coupling of the hose and also avoids damage to the hose should the same be frozen. One can shorten the hose, if occasion requires, by sliding the end thereof farther over the nipple.

The various benefits above pointed out are directly due to the extension of the nipple and the angular bend given the end thereof, and whilst this is apparently a very simple improvement, it is none the less important as will be obvious by comparing the disadvantages of the present nipple and hose as hereinbefore outlined with the advantages gained where my type is employed.

What I claim as my invention is:

1. The combination with the angle cocks of the air pipes of adjoining train sections, of similar nipples screw threaded to the angle cocks and presenting rigid hollow extensions extending angularly downwardly and outwardly from the angle cocks and having their lower ends angularly deflected further outwardly towards one another and short flexible hose attached to the angularly deflected ends of the extensions and adapted to be detachably coupled one to the other.

2. The combination with the angle cock of a train air pipe line, of a nipple screw threaded to the angle cock and embodying an elongated rigid tubular extension having the lower end thereof angularly deflected outwardly and a short length flexible hose attached to said angularly deflected end.

3. The combination with the air pipe line of a train section, an angle cock at one end thereof and a coupling hook at the other end of an air connection between the coupling hook and the angle cock comprising a nipple connected to the angle cock and embodying a rigid tubular extension having an angularly deflected end and a flexible hose connecting the deflected end of the nipple with the coupling hook, the said hose and nipple being substantially equal length.

4. The combination with the air pipe of a train section and an angle cock at the end of the pipe, of a nipple screw threaded to the angle cock and embodying an elongated rigid tubular extension extending angularly outwardly and downwardly and having the lower end of the extension further outwardly deflected.

HERBERT DEAN.